United States Patent [19]

Hrabak et al.

[11] 4,036,909
[45] July 19, 1977

[54] PROCESS FOR THE POLYMERIZATION AND COPOLYMERIZATION OF VINYL AND DIENE COMPOUNDS

[75] Inventors: Frantisek Hrabak; Vlasta Hynkova; Milan Bezdek, all of Prague, Czechoslovakia

[73] Assignee: Ceskoslovenska akademie ved, Prague, Czechoslovakia

[21] Appl. No.: 609,182

[22] Filed: Sept. 2, 1975

Related U.S. Application Data

[60] Division of Ser. No. 389,533, Aug. 20, 1973, Pat. No. 3,998,910, which is a continuation-in-part of Ser. No. 143,225, May 13, 1971, abandoned.

[30] Foreign Application Priority Data

May 14, 1970 Czechoslovakia ............... 3332/70

[51] Int. Cl.² .............................. C08L 25/06

[52] U.S. Cl. .............................. 260/874; 260/975; 260/879; 260/880 R; 260/881; 260/882; 260/883; 260/884; 260/885; 260/886

[58] Field of Search ............. 260/875, 874, 821, 83.5, 260/84.7, 85.7, 89.7 N, 879, 880, 884, 885, 886, 881, 882, 883

[56] References Cited

U.S. PATENT DOCUMENTS 2,857,358  10/1958  Thomas .................. 260/89.7 N

Primary Examiner—J. Ziegler

[57] ABSTRACT

Monomeric conjugated or unconjugated organic compounds are polymerized in an initiator systems consisting of an organic peroxide and a macromolecular compound consisting of a polymer or copolymer of styrene or styrene derivative containing at least one tertiary amine group chemically bound by all its valences to carbon atoms in its macromolecule.

13 Claims, No Drawings

PROCESS FOR THE POLYMERIZATION AND COPOLYMERIZATION OF VINYL AND DIENE COMPOUNDS

This is a divisional application of Ser. No. 389,533, filed 8/20/73, now U.S. Pat No. 3,998,910 and a continuation-in-part of Ser. No. 143,225, now abandoned.

BACKGROUND OF THE INVENTION

This application is a continuation in part of copending application U.S. Ser. No. 143,225, filed May 13, 1971 and entitled "Process for the Polymerization and Copolymerization of Vinyl and Diene Compounds".

This invention relates to new polymeric and copolymeric compositions containing chemically bound tertiary amine nitrogen in the macromolecular structure and processes for their preparation.

The polymerization of unsaturated compounds in the presence of initiating system comprising diacyl peroxides and tertiary amines is known, for example, from U.S. Pat. Nos. 2,647,878 and 2,744,886. However, the starting amines and the products of the reaction of the amines with diacyl peroxide remain free and chemically unbound to the high molecular weight chains of the polymers produced, especially in the case of block or bead polymers. Consequently, the possible diffusion of the amines into the environment presents a serious obstacle in the application of polymers manufactured in this way in numerous areas of use, and particularly in such areas of use as sanitation and nutrition.

There exists, therefore, a need to provide polymeric compositions such as those mentioned above and processes for their preparation which do not exhibit the abovementioned disadvantages and, therefore, permit the use of such polymeric compositions in a wider variety of applications than heretofore employed. The present invention fulfills such a need.

SUMMARY OF THE INVENTION

In accordance with the invention there are provided unsaturated compounds at ambient temperature in the presence of an initiating system comprising an organic peroxide and a macromolecular compound containing at least one chemically bound tertiary amino group in a macromolecule. By macromolecular compounds, containing in its molecules at least one chemically bound tertiary amine group are meant synthetic and natural compounds, with molecules, being formed partly by carbon atoms, where one of the basic, structural units is repeated at least three times. The tertiary amine groups may be built in the macromolecular compound molecule by different ways such as:

a. when preparing them by homopolymerization and copolymerization of ethylenicaly unsaturated monomers such as: poly(N,N-dimethylaminostyrene), poly(-dimethylaminoethylmethacrylate), poly(N-vinylpyrrolidone), poly(N-vinylpyhrolidone), poly(N-vinylcarbazol), poly(N-vinylmorpholine), poly(N,N-dimethylamine-styrene-co-styrene), poly-dimethylaminoethylacrylate-co-methylmethacrylate), b. when preparing them by polyreactions (polyaddition, polycondensation) of low molecular compounds with suitable functional groups e.g. reaction of diglycidylether 2,2-bis-(p-hydroxyphenyl)propane with aniline derivatives/R. L. Bowen, H. Argentar, J. Dental Research 51, 473 (1972)/, c. by polymer analogous reactions on natural and synthetic polymer such as: alkylation or alkylarylation of primary and secondary amine groups, bound to the polymer, by reduction of carbonyl groups in poly(N,N-dialkyl-acrylamide) or by dialkylaminomethylation of poly(2-alkyl-4-vinylphenol)/F. Danusso, P. Ferruti, Polymer 11, 88 (1970); P. Ferruti, A. Bertelli, Polymer 13, (4) 184 (1972)/.

DESCRIPTION OF PREFERRED EMBODIMENTS

According to the invention, the compositions comprise homopolymers and copolymers of unsaturated compounds of the formula

wherein X can be the same or different and can be hydrogen, halogen, —CN,

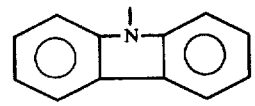

—CH$_2$Y, —C$_6$H$_4$Y, —CY=CHY,

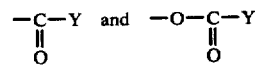

and Y can be hydrogen, halogen, alkyl, hydroxyl, amino, N,N-dialkylamino, N,N-diarylamino, N-alkyl-N-arylamino, N,N-dialkylaminoaryl, N,N-diarylaminoalkyl, N,N-diarylaminoaryl, N-alkyl-N-arylaminoalkyl, N,N-dialkylaminoalkyl, —NHC$_6$H$_4$COOH and —O—C$_6$H$_4$COOH.

The polymers of this invention can be linear or branched and generally have an average degree of polymerization in a range of from about 5 to about 100,000 and more, indicative of average molecular weight in a range from about 500 to about 5 000 000 determined by the vapor-pressure or osmometric methods. The polymeric compositions can also be crosslinked with any known suitable crosslinking agents such as divinylbenzene, glycol methacrylate, and butadiene and the like. Moreover, depending on the character of the compounds or materials being polymerized, or on the ratio in the original polymerization mixture, the homopolymers or copolymers formed can be plastic, rubbery or hard and they may be used as adhesives, rubbers, lacquers, thermoplasts or thermosets.

When the tertiary amine nitrogen is already present in the starting unsaturated compound, homopolymers can be formed simply by polymerizing the polymerization components in the presence of a suitable peroxide. Where such is not the case, the macromolecular tertiary amine is provided as part of the initiating system and copolymers are thusly obtained.

In general, a wide variety of unsaturated compounds or materials having the above formula

can be employed in carrying out the practice of this invention. Such compounds or materials include all known vinyl compounds and conjugated diene compounds. Exemplary but not limitative unsaturated compounds or materials suitable for use in this invention are vinyl compounds such as styrene and its derivative, divinylbenzene, vinylchloride, vinylpyridine, N-vinylpyrrolidone, acrylic acid and its derivatives, vinylidene chloride, vinyl acetate and the like; conjugated diene compounds or materials such as chloroprene, butadiene, isoprene, 2,3-dichlorbutadiene and the like; vinyl and conjugated diene compounds or materials containing tertiary amine nitrogen such as p-dimethylaminostyrene, 2-dimethylaminoethyl acrylate, 2-dimethylaminoethyl methacrylate, N-vinylcarbazole and product of dialkylaminomethylation of poly(2-alkyl-4-vinylphenol) and the like. Moreover, compounds such as those set forth which are already polymerized and copolymerized can also be reacted in accordance with this invention to form more complex polymeric molecules.

The polymerizable materials or reactants employed in this invention can be utilized in all proportions or ratios with such other depending upon the desired properties and the use of the product. However, the most appropriate unsaturated compounds are those whose polymerization is not retarded by the tertiary amine nitrogen material employed.

The effect of a chosen macromolecular tertiary amine upon the polymerization of a particular unsaturated compound can be determined experimentally. Thus for example, poly(p-dimethylaminostyrene) retards the polymerization of vinyl acetate but initiates without retardation in the presence of benzoylperoxide the polymerization of styrene and methyl methacrylate.

Any macromolecular compound with chemically bound tertiary amino group can be used in carrying out the present invention.

Generally the peroxide employed is used in an amount ranging from about 0.01 percent to about 5.0 percent by weight, based on the monomer weight. It is preferable, however, to employ the peroxide in an amount of from about 0.2 to 0.3 percent to about 1.0 percent by weight, based on the monomer weight. The amount of amine is preferably chosen in such a manner that the molar number of tertiary amino groups equals approximately the molar number of peroxide groups in the amount of peroxide employed. However, the molar ratio between peroxide and amino groups can be used within the range 1:10 to 10:1. Moreover, the polymerization of some unsaturated compounds such as chloroprene occurs without the addition of peroxide, the reaction probably proceeding by initiation of the absorbed oxygen. These ranges also apply where polymeric materials are being further combined.

Peroxides which can be employed include the diacyl peroxides, diarylperoxides and dialkyl peroxides. However, because of their thermal stability, dibenzoylperoxide, dilauroylperoxide and di-tert-butylperoxide have been found to be particularly useful.

Where the substituents X and Y in the formula set forth above are of non-polar character, alcohols can be used as precipitating agents for the polymers and copolymers. On the other hand, where the substituents are polar, saturated aliphatic and alicyclic hydrocarbons are generally used as precipitating agents for the polymer.

The preparation of the new polymeric compositions of this invention broadly comprises mixing the unsaturated compound or compounds and the perioxide or peroxide tertiary amine initiating system and polymerizing the mixture at ambient temperatures, generally at about 25° C, until polymerization is complete. However, temperatures ranging from about 20° C to about 30° C are preferred and the upper limit may be as high as the decomposition temperature of the materials to be reacted and of the final reaction product. The polymeric material so formed can then be precipitated, depending upon whether it is polar or nonpolar in character, with a suitable precipitating agent as mentioned above.

The polymeric materials of this invention and the preparation thereof present many advantages, for example, the polymers contain chemically bound tertiary amine nitrogen and, therefore can be used in a wide variety of fields including the areas of sanitation and nutrition. Moreover, they are simple to prepare under relatively mild conditions on existing equipment and with readily available materials.

In order to illustrate the present invention more fully the following examples are set forth. It is to be understood that the examples are illustrative and not limitative. In the examples and the appended claims all parts, proportions and percentages are by weight unless otherwise stated.

EXAMPLE I

Solutions of 0.083 gram of benzoyl peroxide in 3 grams of styrene and 0.051 gram of poly(p-dimethylaminostyrene) in 3.2 grams of styrene were mixed together in glass ampoules having two arms and which had been previously flushed with nitrogen, sealed, and placed into a bath maintained at the constant temperature of 20° C. The mixture was thick and gelatinous after 1 hour and when precipitated with methanol formed a hard, slightly yellowish polymer. It had a number average molecular weight of 45 000 and was suitable for use as block or powder polystyrene.

EXAMPLE II

Solutions of 0.088 gram of benzoyl peroxide in 3 grams of chloroprene and 0.054 gram of poly(p-dimethylaminostyrene) in 4 grams of chloroprene were mixed and further worked up as in the case of Example I. The ampoule became considerably warm and the mixture turned into a rubber-like, pale brown polymer after several minutes which was crosslinked and insoluble in benzene and was suitable for use as vulcanized polychloroprene rubber.

EXAMPLE III

A solution consisting of 0.20 gram of lauroyl peroxide in 4.4 grams of methyl methacrylate was mixed with a solution containing 0.30 gram of a copolymer of methyl methacrylate and N,N-dimethylaminoethyl methacrylate in a glass dilatometer which was then placed in a bath having a constant temperature of 20° C. According to the volume and contraction of the mixture, the polymerization took place at a rate of 0.7% in an hour. The solid, colorless polymer was precipitated from the mixture with methanol and had a number average molecular weight of 62 000 and was suitable for use as a molding polymer.

EXAMPLE IV

A solution of 0.0067 gram of benzoyl peroxide in 0.5 gram of styrene was added to 0.5 gram of the powdery polystyrene and 0.0041 gram of poly(p-dimethylaminostyrene). The resulting mixture was mixed and kept in a test tube under a nitrogen blanket at the ambient room temperature of about 20° to 30° C. It became hard and slightly yellowish after 18 hours, had an average molecular weight of 46 000. The polymeric mixture is suitable for use as selfcuring monomer-polymer composition.

EXAMPLE V

A mixture of 0.3 gram of powdery polystyrene, 0.005 gram of poly(p-dimethylaminostyrene), 0.7 gram of chloroprene and 0.009 gram of benzoyl peroxide was blended together and kept under a nitrogen blanket in a sealed test tube at the room temperature of about 20° to 30° C. The polymer which was formed was tough and brownish colored after 18 hours. It was crosslinked and was suitable for use as modified vulcanized polychloroprene rubber.

EXAMPLE VI

A copolymer of styrene and p-dimethylaminostyrene (molecular ratio 50:1) in an amount of 0.5 gram was stirred into a solution of 0.0064 gram of benzoyl peroxide in 0.5 gram of methyl methacrylate and the mixture was kept in a sealed test tube which had previously been filled with nitrogen. The content of the test tube was hard and colorless after 20 hours of standing, the product had a number average molecular weight of 65 000 and was suitable for use as selfcuring dental materials.

EXAMPLE VII

A solution of 0.048 gram of lauroyl peroxide in 0.5 gram of styrene was blended with 0.5 gram of the copolymer of methyl methacrylate and N,N-dimethylaminoethyl acrylate (molecular ratio 40:1). The mixture was sealed in a test tube under a nitrogen blanket and the test tube was kept in a laboratory stand. The test tube was opened after 20 hours and the polymer formed was hard and cloudy, had a number average molecular weight of 84 000. The starting mixture is suitable for use as selfcuring monomer-polymer composition.

EXAMPLE VIII

A solution of 1 gram of copolymer of methyl methacrylate and N,N-dimethylaminoethyl acrylate (molecular ratio 40:1) in 15 grams of methyl methacrylate was mixed with a solution containing 0.058 gram of benzoyl peroxide in 3 grams of methyl methacrylate in an evacuated ampoule. The clear, flowable liquid turned to a syrup after 17 hours. The poly(methyl methacrylate) which was precipitated with methanol had an average molecular weight of 56 000.

EXAMPLE IX

To a solution of 0.2 gram of a copolymer of styrene and p-dimethylaminostyrene (molecular ratio 50:1) in 0.8 gram of cloroprene, 0.009 gram of benzoyl peroxide was added. Nitrogen was passed through the resulting mixture which was then kept in a sealed ampoule at room temperature, i.e. about 20° to 30° C. The mixture had the character of a gel after 18 hours and of a rubber-like polymer after 72 hours, and was crosslinked. The starting composition, as well as the monomer-polymer compositions in examples 2 and 5, is suitable to transform liquid monomer to solid vulcanized product.

EXAMPLE X

Solutions of 0.083 gram of benzoyl peroxide in 4 grams of styrene and of 0.050 gram of N,N-dimethyl-p-aminostyrene in 2.2 grams of styrene were mixed in a glass dilatometer. The dilatometer was placed in a bath with a controlled constant temperature of 25° C. According to the volume contraction of the mixture, the polymerization took place at a rate of 4.4% in an hour. The polymer at completion of the reaction was precipitated from the reaction mixture by addition of an excess of methanol, as a slightly yellowish powder, having an average molecular weight of 45 000.

EXAMPLE XI

Solutions of 0.083 gram of benzoyl peroxide in 4 grams of methylmethacrylate and 0.051 gram of N,N-dimethyl-p-aminostyrene in 2.5 grams of methyl methacrylate were mixed in a glass dilatometer at 25° C. The polymerization rate was 9.7% in an hour. The colorless powdery polymer formed at completion of the reaction was precipitated by methanol, had an average molecular weight of 85 000.

EXAMPLE XII

A mixture of solutions consisting of 0.081 gram of benzoyl peroxide in 4 grams of chloroprene and 0.049 gram of N,N-dimethyl-p-aminostyrene in 2.4 grams of chloroprene was polymerized at 20° C at the rate of 6.6% of the monomer present in an hour. The plastic, brownish-red polymer was precipitated at completion of the reaction by addition of methanol. It was cross-linked and insoluble in benzene.

EXAMPLE XIII

Polymerization of a mixture consisting of 6.6 grams of styrene, 0.008 gram of benzoyl peroxide and 0.057 gram of N,N-dimethylaminoethyl methacrylate was carried out at 25° C at a rate of 1.2% in an hour. The polymer on completion was precipitated with methanol and was fibrous and brownish, having an average molecular weight of 26 000.

EXAMPLE XIV

Polymerization of a mixture consisting of 6.45 grams of methyl methacrylate, 0.136 gram of lauroyl peroxide and 0.049 gram of N,N-dimethylaminoethyl acrylate was carried out at 25° C at a rate of 1.4% in an hour. The polymer after completion of the reaction and after precipitation with methanol was tough and colorless.

EXAMPLE XV

A solution of 0.003 gram of N,N-dimethyl-p-aminostyrene in 0.4 gram of styrene was added to 0.6 gram of finely ground polystyrene and 0.005 gram of benzoyl peroxide powder. The sticky mixture was plasticized and then kept in a sealed test tube at room temperature of about 20° C to 25° C under an atmosphere of nitrogen. It became hard and brownish after 24 hours.

EXAMPLE XVI

A mixture of 0.3 gram of polystyrene, 0.009 gram of benzoyl peroxide, 0.7 gram of styrene and 0.006 gram of N,N-dimethyl-p-aminostyrene was blended and kept in a sealed test tube under nitrogen at room temperature of about 20° C to 25° C. The originally sticky, syrupy blend was converted into a brownish gel within 18 hours.

EXAMPLE XVII

A mixture of 0.6 gram of poly(methyl methacrylate) with 0.005 gram of benzoyl peroxide, 0.4 gram of stytene and 0.003 gram of N,N-dimethyl-p-aminostyrene was plasticized and placed into a sealed test tube filled with nitrogen. The contents of the test tube were hard and colorless after being kept in a laboratory stand for 20 hours.

EXAMPLE XVIII

A mixture of 0.6 gram of polystyrene with 0.005 gram of benzoyl peroxide and 0.4 gram of methyl methacrylate with 0.003 gram of N,N-dimethylaminoethyl was plasticized and kept in a sealed test tube under nitrogen at room temperature of about 25° C. It became hard and colorless after 18 hours.

EXAMPLE XIX

The mixture as described in Example XVIII, but containing 0.008 gram of lauroyl peroxide instead of benzoyl peroxide became hard and colorless after being kept in a laboratory test tube for 18 hours. The starting composition as well as the compositions in examples 15, 17 and 18, is suitable for use as selfcuring monomer-polymer composition.

Similar materials such as those mentioned hereinbefore when processed according to the foregoing examples gave products of like properties.

We claim:

1. A process for polymerization or copolymerization of monomeric olefinic conjugated or unconjugated unsaturated organic compound or their combinations comprising the step of providing a mixture consisting of monomeric olefinic unsaturated organic compound and an initiator system comprising (a) an organic peroxide and (b) a polymeric or copolymeric tertiary amine selected from the group consisting of poly(p-dimethylaminostyrene), copolymers of styrene and p-dimethylaminostyrene, poly (N,N-dimethylaminostyrene) and copolymers of styrene and N,N-dimethylaminostyrene, and polymerizing said mixture at a temperature of from about 20° to about 30° C. until completion of the polymerization, said initiator system comprising from 0.01 to 5% by weight based on said organic compound of an organic peroxide selected from the group consisting of diacylperoxides, diarylperoxides and dialkylperoxides and such an amount of amine that the molar ratio between peroxide amine groups is within the range from 10:1 to 1:10.

2. A process according to claim 1 wherein said tertiary amine is poly(p-dimethylaminostyrene).

3. A process according to claim 1 wherein said tertiary amine is a copolymer of styrene and p-dimethylaminostyrene.

4. A process according to claim 1 wherein said tertiary amine is poly (N, N-dimethylaminostyrene).

5. A process according to claim 1 wherein said tertiary amine is a copolymer of styrene and N, N-dimethylaminostyrene.

6. A polymeric composition prepared by the process of claim 1.

7. A polymeric composition according to claim 6 wherein said tertiary amine is poly (p-dimethylaminostyrene).

8. A polymeric composition according to claim 6 wherein said tertiary amine is a copolymer of styrene and p-dimethylaminostyrene.

9. A polymeric composition according to claim 6 wherein said tertiary amine is poly (N, N-dimethylaminostyrene).

10. A polymeric composition according to claim 6 wherein said tertiary amine is a copolymer of styrene and N, N-dimethylaminostyrene.

11. The process according to claim 1 wherein said organic peroxides is present in an amount between about 0.2 to 1% by weight based on said monomeric compound.

12. The process according to claim 1, wherein said amount of amine is such that the molar ratio between peroxide and amine groups is substantially equal.

13. The method according to claim, 1, wherein said monomeric compound has the general formula:

$$\begin{array}{c} X \quad X \\ | \quad | \\ C = C \\ | \quad | \\ X \quad X \end{array}$$

wherein X which can be the same or different is hydrogen, halogen, —CN,

—CH$_2$Y, —C$_6$H$_4$Y, —CY=CHY,

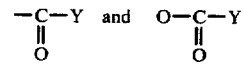

and wherein Y is hydrogen, halogen, alkyl, hydroxyl, amino, N,N-dialkylamino, N,N-diarylamino, N,N-dialkylaminoalkyl, N-alkyl-N-arylamino, N,N-dialkylaminoaryl, N,N-diarylaminoalkyl, N,N-diarylaminoaryl, N-alkyl-N-arylaminoalkyl, —NHC$_6$H$_4$COOH and —O—C$_6$H$_4$COOH.

* * * * *